E. H. KRUSE.
CONNECTOR FOR ELECTRIC WIRES.
APPLICATION FILED SEPT. 19, 1919.
1,386,634. Patented Aug. 9, 1921.
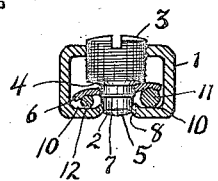
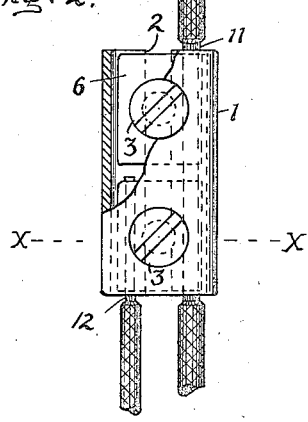
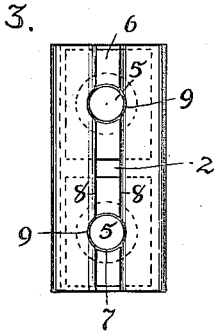
Edward H Kruse INVENTOR
BY
W. G. Burns ATTORNEY.

UNITED STATES PATENT OFFICE.

EDWARD H. KRUSE, OF FORT WAYNE, INDIANA.

CONNECTOR FOR ELECTRIC WIRES.

1,386,634.      Specification of Letters Patent.    Patented Aug. 9, 1921.

Application filed September 19, 1919. Serial No. 324,738.

*To all whom it may concern:*

Be it known that I, EDWARD H. KRUSE, a citizen of the United States of America, and resident of Fort Wayne, in the county of Allen and State of Indiana, have invented certain new and useful Improvements in Connectors for Electric Wires, of which the following is a specification.

This invention relates to improvements in connectors for electric wires, and the object thereof is to provide a device so constructed as to effectively secure two or more conducting wires of similar or varying sizes together, and to form electrical connection therebetween without the use of solder.

The object of the improvement is accomplished by the construction illustrated in the accompanying drawings in which:

Figure 1 is a transverse section of the device upon the line X—X of Fig. 2;

Fig. 2 is a plan view of the same partly cut away and in section; and

Fig. 3 is a bottom plan of the same.

Similar characters of reference indicate corresponding parts throughout the several views, and referring now to the same:

1 is an open-ended box having a slot 2 in its bottom that extends throughout its length and a pair of screws 3 extending through its top. Each screw has a slanting shoulder 4 and an extending stud 5 at its lower end upon which is secured a loose clamp plate 6 of rectangular form, a bead 7 or slight upset on the stud serving to retain the plate thereon. The inner edges 8 of the bottom of the box have oppositely disposed recesses 9 for the reception of the corresponding sides of the studs of the screws respectively. The edges 8 of the box are curved slightly inward so that an internal gutter 10 is formed along each side of the slot in the bottom of the box. Each plate 6 is positioned on the corresponding screw 3 and is contained within the box and its opposite edges are curved slightly downward.

In using the invention, the insulation is removed from the parts of the wires 11—12 to be connected, and the exposed parts are inserted in the gutters. The plates are then clamped upon the wires by tightening the screws. When the wire in one gutter is of different diameter than that of the wire in the opposite gutter, the plate under which they are clamped accommodates itself by assuming a slanting position. Or, if only one wire is connected in one end of the box, the wire is inserted in one of the gutters and clamped beneath the corresponding side of the plate with the opposite side thereof bearing in the opposite gutter.

In applying the device to a wire 11 between its ends, the screws are backed out sufficiently to withdraw the projecting studs away from the slot in the box so as to permit the insertion of the wire through the slot into the gutter, and when the screws are again driven into place the studs prevent removal of the wires through the slot, and the recessed edges of the bottom serve as guides for the studs.

When the wires have been secured in the box, the adjacent ends of the wires and the box are insulated by applying tape in the usual manner.

What I claim is:

1. In a connector for electric wires, an open-ended box having a slot extending throughout its length, there being opposite pairs of recesses in the bottom coincident with the slot, a pair of screws, each extending through the top of the box and having a stud adapted to project into the slot and corresponding recesses, and a loosely secured clamp plate on the stud of each screw.

2. In a device for connecting wires, an open-ended box the bottom thereof having parallel gutters therein and an intervening slot, a pair of screws extending through the top of the box and each having a stud adapted to extend into the slot so as to obstruct the removal of wire through the slot, and a clamp plate on the stud of each screw for holding wire in the gutters.

3. In a device for connecting wires, an open-ended box having a longitudinal slot in its bottom, a pair of screws each extending through the top of the box and having a stud adapted to extend into the slot so as to obstruct the removal of wire from the box through the slot therein, and a clamp plate for each screw loosely engaged upon the stud thereof.

In testimony whereof I affix my signature, in presence of two witnesses.

EDWARD H. KRUSE.

Witnesses:
 W. G. BURNS,
 L. H. DUNTEN.